US009509148B2

(12) United States Patent
Kako et al.

(10) Patent No.: US 9,509,148 B2
(45) Date of Patent: *Nov. 29, 2016

(54) ELECTRIC STORAGE DEVICE

(71) Applicant: GS Yuasa International Ltd., Kyoto-shi, Kyoto (JP)

(72) Inventors: Tomonori Kako, Kyoto (JP); Hidefumi Hasegawa, Kyoto (JP); Katsushi Nishie, Kyoto (JP); Sumio Mori, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 143 days.

This patent is subject to a terminal disclaimer.

(21) Appl. No.: 14/060,670

(22) Filed: Oct. 23, 2013

(65) Prior Publication Data

US 2014/0176074 A1 Jun. 26, 2014

Related U.S. Application Data

(63) Continuation of application No. 13/468,114, filed on May 10, 2012, now Pat. No. 8,597,827.

(30) Foreign Application Priority Data

May 11, 2011 (JP) .................................. 2011-106195
Apr. 4, 2012 (JP) .................................. 2012-085291

(51) Int. Cl.
| | | |
|---|---|---|
| H01M 4/13 | (2010.01) | |
| H01M 4/36 | (2006.01) | |
| H01M 4/62 | (2006.01) | |
| H01M 2/16 | (2006.01) | |
| H01M 10/0525 | (2010.01) | |
| H01M 10/0567 | (2010.01) | |
| H01M 10/42 | (2006.01) | |
| H02J 7/00 | (2006.01) | |
| H01G 11/60 | (2013.01) | |

(52) U.S. Cl.
CPC ................ H02J 7/00 (2013.01); H01G 11/60 (2013.01); H01M 2/166 (2013.01); H01M 2/1646 (2013.01); H01M 2/1686 (2013.01); H01M 4/13 (2013.01); H01M 4/366 (2013.01); H01M 4/62 (2013.01); H01M 10/0525 (2013.01); H01M 10/0567 (2013.01); H01M 10/4235 (2013.01); Y02E 60/122 (2013.01); Y02E 60/13 (2013.01); Y02P 70/54 (2015.11); Y02T 10/7011 (2013.01); Y02T 10/7022 (2013.01); Y10T 29/49115 (2015.01)

(58) Field of Classification Search
None
See application file for complete search history.

(56) References Cited

U.S. PATENT DOCUMENTS

| | | |
|---|---|---|
| 5,188,395 A | 2/1993 | Kawahara et al. |
| 2004/0259000 A1 | 12/2004 | Adachi et al. |
| 2008/0138714 A1 | 6/2008 | Ihara et al. |
| 2009/0111025 A1 | 4/2009 | Lee et al. |
| 2009/0286155 A1 | 11/2009 | Takehara |
| 2009/0286164 A1 | 11/2009 | Wada et al. |
| 2010/0155659 A1 | 6/2010 | Yang et al. |
| 2011/0111288 A1 | 5/2011 | Nishida et al. |
| 2012/0208070 A1 | 8/2012 | Nakashima et al. |

FOREIGN PATENT DOCUMENTS

| | | | |
|---|---|---|---|
| CN | 1610174 A | | 4/2005 |
| EP | 2618418 A1 | | 7/2013 |
| JP | 2167746 A | | 6/1990 |
| JP | 38966 A | | 1/1991 |
| JP | 11329505 A | * | 11/1999 |
| JP | 2004111349 A | | 4/2004 |
| JP | 2005285491 A | | 10/2005 |
| JP | 3974012 B2 | | 9/2007 |
| JP | 2007280781 A | | 10/2007 |
| JP | 2007534122 A | | 11/2007 |
| JP | 2007335143 A | | 12/2007 |
| JP | 2008010183 A | | 1/2008 |
| JP | 2008198432 A | | 8/2008 |
| JP | 2008210573 A | | 9/2008 |
| JP | 2008226807 A | | 9/2008 |
| JP | 2009129541 A | | 6/2009 |
| JP | 2009199960 A | | 9/2009 |
| JP | 2009245828 A | | 10/2009 |
| JP | 2009277597 A | | 11/2009 |
| JP | 2010287512 A | | 12/2010 |
| JP | 2011049153 A | | 3/2011 |
| JP | 2011077052 A | | 4/2011 |
| JP | 2011082033 A | | 4/2011 |
| WO | WO 9852244 A1 | * | 11/1998 |
| WO | 2010067549 A1 | | 6/2010 |
| WO | WO 2010079565 A1 | * | 7/2010 |
| WO | 2010147106 A1 | | 12/2010 |
| WO | 2011021644 A1 | | 2/2011 |

OTHER PUBLICATIONS

J-PlatPat Machine Translation of the Detailed Description of JP 2009-277597A (Nov. 26, 2009).*
Sheng Shui Zhang, "An Unique Lithium Salt for the Improved Electrolyte of Li-ion Battery", Electrochemistry Communications, Aug. 1, 2006, pp. 1423-1428, vol. 8.

* cited by examiner

Primary Examiner — Gregg Cantelmo
(74) Attorney, Agent, or Firm — The Webb Law Firm

(57) ABSTRACT

Provided is an electric storage device including a positive electrode, a negative electrode, a separator disposed between the positive electrode and the negative electrode, a nonaqueous electrolyte solution in which an electrolyte is dissolved in a nonaqueous solvent, wherein an inorganic filler layer is disposed between the positive electrode and the negative electrode and the nonaqueous electrolyte solution contains lithium difluorobis(oxalato)phosphate.

7 Claims, No Drawings

ELECTRIC STORAGE DEVICE

CROSS-REFERENCE TO RELATED APPLICATION

This application is a continuation of U.S. patent application Ser. No. 13/468,114, filed May 10, 2012, entitled "Electric Storage Device", now U.S. Pat. No. 8,597,827, which claims the benefit of Japanese Patent Application Nos. 2011-106195 and 2012-085291. The disclosure of the foregoing applications are all incorporated herein by reference.

BACKGROUND OF THE INVENTION

1. Field of the Invention

The present invention relates to an electric storage device including a nonaqueous electrolyte solution in which an electrolyte is dissolved in a nonaqueous solvent.

2. Background Art

In recent years, rechargeable electric storage devices including nonaqueous electrolyte cells represented by lithium ion cells and capacitors such as electric double layer capacitors and the like have been used as power sources for electronic equipment, power sources for power storage, power sources for electric vehicles and the like, whose performance enhancement and downsizing have been progressed.

The nonaqueous electrolyte cell is a cell in which a negative electrode and a positive electrode prepared by providing a negative electrode active material layer and a positive electrode active material layer on a current collector composed of a metal foil, respectively, are arranged to face each other through a separator electrically separating the electrodes, and ions are accepted and donated between the positive electrode and negative electrode in a nonaqueous electrolyte solution, in which an electrolyte is dissolved in a nonaqueous solvent, to charge and discharge the cell.

Known examples of the nonaqueous electrolyte solution include solutions that contain a lithium phosphate derivative such as lithium difluorobis(oxalato)phosphate (Patent Document 1: Japanese Patent No. 3974012 and Patent Document 2: Japanese Patent Application Laid-Open No. 2007-335143).

Adding lithium difluorobis(oxalato)phosphate to a nonaqueous electrolyte solution increases the cycle performance of the cell and enhances the high-temperature storageability of the cell. Accordingly, the nonaqueous electrolyte solution to which lithium difluorobis(oxalato)phosphate is added can have great effects as the nonaqueous electrolyte solution for nonaqueous electrolyte cells such as lithium ion cells. The greater the additive amount of lithium difluorobis(oxalato) phosphate, the greater the effect is.

However, lithium difluorobis(oxalato)phosphate added to the nonaqueous electrolyte solution of a cell can be reductively decomposed to generate gas during initial charge. As a result, the cell can swell. When gas is generated between the negative and positive electrodes, current applied concentrates on that location, reducing the life of the cell. Therefore, there is a problem that a sufficient amount of lithium difluorobis(oxalato)phosphate cannot be added.

A known approach to preventing swelling of a typical cell that uses an electrolyte containing a lithium salt is to provide an insulating inorganic oxide layer (hereinafter referred to as the insulating layer) on a separator as described in Japanese Patent Application Laid-Open No. 2009-199960 and Japanese Patent Application Laid-Open No. 2009-277597, for example.

The insulating layer provided on the separator inhibits decomposition of the electrolyte in the electrolyte solution near the insulating layer and therefore is believed to inhibit generation of gas.

However, while the insulating layers described in Japanese Patent Application Laid-Open No. 2009-199960 and Japanese Patent Application Laid-Open No. 2009.277597 can inhibit generation of gas during a cycle and storage, the effect of the insulating layers is not great enough to inhibit generation of gas during initial charge. Especially when lithium difluorobis(oxalato)phosphate is added to a nonaqueous electrolyte solution, it is difficult to adequately inhibit swelling that can be caused by gas generation during the initial charge.

That is, there has been a problem that a sufficient amount of lithium difluorobis(oxalato)phosphate cannot be added because lithium difluorobis(oxalato)phosphate generates gas during reductive decomposition and, if added to a nonaqueous electrolyte solution, swelling of the cell may be increased by gas generation after initial charge and discharge.

SUMMARY OF THE INVENTION

In light of the problem with the related art described above, an object of the present invention is to provide an electric storage device, such as a nonaqueous electrolyte cell, in which lithium difluorobis(oxalato)phosphate is added to a nonaqueous electrolyte solution and which is capable of inhibiting swelling due to gas generation after initial charge and discharge.

According to the present invention, an electric storage device includes:

a positive electrode;

a negative electrode;

a separator disposed between the positive electrode and the negative electrode;

a nonaqueous electrolyte solution in which an electrolyte is dissolved in a nonaqueous solvent; and an inorganic filler layer disposed between the positive electrode and the negative electrode;

wherein the nonaqueous electrolyte solution contains lithium difluorobis(oxalato)phosphate.

DETAILED DESCRIPTION OF THE PREFERRED EMBODIMENTS

A cell which is one embodiment of the electric storage device according to the present invention will be described below. The cell according to this embodiment is a nonaqueous electrolyte secondary cell, more specifically, a lithium ion secondary cell.

(First Embodiment)

A cell of this embodiment includes a positive electrode, a negative electrode, a separator disposed between the positive electrode and the negative electrode, and a nonaqueous electrolyte solution in which an electrolyte is dissolved in a nonaqueous solvent. The cell of this embodiment is a cell in which an inorganic filler layer is disposed between the positive electrode and the negative electrode, the nonaqueous electrolyte solution contains lithium difluorobis(oxalato)phosphate, and the inorganic filler layer is disposed on the separator.

In particular, the cell of this embodiment includes a negative electrode including a negative-electrode active material layer and a positive electrode including a positive-electrode active material layer. The active material layers are arranged to face each other with a separator therebetween. The electrodes are contained in a case together with a nonaqueous electrolyte solution.

As the separator, woven fabric, nonwoven fabric, or a synthetic resin microporous membrane that is insoluble in organic solvent may be used, among which a synthetic resin microporous membrane is preferable.

Among various synthetic resin microporous membranes, especially polyethylene and polypropylene microporous membranes, microporous membranes of polyethylene and polypropylene combined with aramid or polyimide, or a polyolefin microporous membrane such as a microporous membrane of a composite of any of these resins are preferable in terms of factors such as thickness, membrane strength, and membrane resistance.

The separator has a thickness in the range of 6 µm to 40 µm, preferably in the range of 12 µm to 25 µm.

The porosity of the separator is preferably in the range of 30 volume % to 60 volume % because a porosity in this range can maintain the strength and provide good charge-discharge performance.

The term porosity of the separator as used herein refers to a value calculated according to Equation (3) given below.

$$\text{porosity of separator (volume \%)} = [\{\text{volume} - (\text{mass} \div \text{membrane density})\} \div \text{volume}] \times 100 \quad (3)$$

The mass and the volume are the mass (mg) and the volume (mm$^3$) of a separator having a predetermined size (the predetermined size is a size that can be accurately measured, for example 100 mm×100 mm in the case of a sheet-shaped separator material). The membrane density is the membrane density (g/cm$^3$) of the separator.

In this embodiment, the inorganic filler layer is disposed on a surface of the separator.

Specifically, the inorganic filler layer is formed on at least one side of the separator.

The inorganic filler layer is formed, for example, by coating at least one side of the separator with a paste of a mixture of an inorganic filler and a binder.

The inorganic filler is preferably made of a material that has a melting point higher than or equal to 200° C., has a high electrical insulation, and is electrochemically stable in the range of use of the lithium ion secondary cell.

Examples of the inorganic filler includes: oxide ceramics such as silica, alumina, titania, zirconia, magnesia, ceria, yttria, zinc oxide, and iron oxide; nitride ceramics such as silicon nitride, titanium nitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, aluminosilicate, calcium silicate, magnesium silicate, diatomaceous earth, and silica sand; and glass fiber.

Any one of these inorganic fillers or a mixture of two or more of these may be used.

Among these inorganic fillers, especially silica, aluminosilicate and the like are preferable because they are inorganic substances predominantly composed of $SiO_2$.

If an inorganic filler that is predominantly composed of $SiO_2$ is used, the $SiO_2$-equivalent mass ratio of the Si element is preferably greater than or equal to 40%, more preferably greater than or equal to 50% and less than or equal to 80%.

An inorganic filler that has an $SiO_2$-equivalent mass ratio in the inorganic filler within these ranges can effectively inhibit initial cell swelling.

The term $SiO_2$-equivalent mass ratio of an Si element as used herein refers to the ratio of the mass of $SiO_2$ in oxides contained in the inorganic filler layer, which is determined by extracting element species, K, Na, Ca, Ba, Rb, Cs, Al, Mg, Fe, Ti, Mn, Cr, Zn, V, Be, B, Si, Zr, Ce, and Y contained in the inorganic filler layer and calculating the mass of each element, on the assumption that all of these element species exist in the form of oxides, $K_2O$, $Na_2O$, $CaO$, $BaO$, $Rb_2O$, $Cs_2O$, $Al_2O_3$, $MgO$, $Fe_2O_3$, $TiO_2$, $MnO$, $Cr_2O_3$, $ZnO$, $V_2O_5$, $BeO$, $B_2O_3$, $SiO_2$, $ZrO_2$, $CeO_2$, and $Y_2O$, respectively.

If two or more inorganic fillers are used, the $SiO_2$-equivalent mass ratio in the inorganic fillers is calculated from the sum of the masses of $SiO_2$ and other oxides in the inorganic fillers.

Methods for measuring the $SiO_2$-equivalent mass ratio in the inorganic filler layer include quantitative analysis of the elements using a system such as an X-ray fluorescence spectrometer, an EPMA (electron probe microanalyzer), an NMR (nuclear magnetic resonator), and an ICP-OES (inductively coupled plasma optical emission spectrometer).

The inorganic filler may be of any shape that can be mixed with the binder and applied to the separator, such as particulate or fibrous, and is not limited to a particular shape.

For a particulate inorganic filler, the average diameter of the particles is preferably in the range of approximately 0.1 µm to approximately 3.0 µm because of ease of mixing with the binder and ease of application.

The binder to mix with the inorganic filler is preferably one that can bind the inorganic filler to the separator, is insoluble in the electrolyte solution, and electrochemically stable in the range of use of the lithium ion secondary cell.

For example, the binder is preferably a fluorine-containing resin such as polyvinylidene fluoride (PVdF) or polytetrafluoroethylene, styrene-butadiene rubber (SBR), acrylic resin, polyolefin resin, polyvinyl alcohol, or a nitrogen-containing resin such as polyamide, polyimide, or polyamide-imide, or a cross-linked polymer of cellulose and acrylamide, a cross-linked polymer of cellulose and chitosan pyrrolidone carboxylic acid, or polysaccharide macromolecular polymer such as chitosan or chitin cross-linked by a cross-linker.

The content of the binder can be adjusted to be appropriate for biding the inorganic filler to the separator without reducing the permeability of the separator and the retention ability of the electrolyte solution. The content is preferably approximately 1 to 20 weight % of the inorganic filler.

To form the inorganic filler layer on the separator, one side of the separator is coated with a mixture of the inorganic filler and the binder and the coating is dried appropriately.

The thickness of the dried coating is preferably greater than or equal to 3 µm and less than or equal to the thickness of the separator.

The thickness of the dried coating is preferably in the range of 5 µm to 12 µm, and more preferably in the range of approximately 5 µm to approximately 10 µm, provided that the thickness is less than or equal to the thickness of the separator.

If the thickness of the inorganic filler layer is 3 µm or greater, swelling during the initial charge can be more effectively inhibited. At the same time, a thickness less than the thickness of the separator cannot prevent penetration of the electrolyte solution to the positive and negative electrode plates through the inorganic filler layer during the manufacturing of the cell.

The porosity of the inorganic filler layer is less than or equal to 70 volume %, preferably in the range of 50 volume % to 70 volume %, more preferably in the range of 60 volume % to 70 volume %.

Furthermore, the porosity of the inorganic filler layer is preferably in these ranges and greater than or equal to the porosity of the separator.

If the porosity of the inorganic filler layer is less than the porosity of the separator, the inorganic filler layer tends to clog, which can result in a high internal resistance of the separator.

Limiting the thickness to the ranges stated above can reduce a decrease in the energy density and power density of the cell due to an increase in the weight of the cell.

Furthermore, limiting the thickness to the ranges stated above can inhibit a decrease in power due to an increase in the diffusion resistance of lithium ions in the inorganic filler layer which can occur if the inorganic filler layer is excessively thick.

Limiting the porosity of the inorganic filler layer in the ranges stated above in this embodiment can be made by, for example, adjusting the mixture ratio of the inorganic filler and the binder or the thickness of the coating of the inorganic filler.

The term porosity of the inorganic filler layer as used herein refers to a value calculated according to Equations (1) and (2) given below if the inorganic filler layer is disposed on the separator.

porosity of inorganic filler layer (volume %)=100−{(coating density÷true density)×100}  (1)

coating density=coating mass of inorganic filler (g/cm²)÷thickness of separator (μm)  (2)

If a binder is included, the coating mass and true density of the inorganic filler are the sums of coating masses and true densities, respectively, of the inorganic filler and the binder.

The nonaqueous electrolyte solution of this embodiment is a solution in which lithium difluorobis(oxalato)phosphate having the following chemical structural formula is dissolved in a nonaqueous solvent.

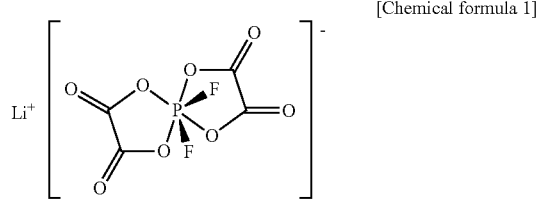

[Chemical formula 1]

The concentration of lithium difluorobis(oxalate)phosphate in the nonaqueous solution is preferably greater than or equal to 0.2 mass % and less than or equal to 1 mass % (greater than or equal to 0.008 mol/kg and less than or equal to 0.04 mol/kg). A concentration in this range can effectively inhibit swelling.

The nonaqueous solvent can be selected from well-known nonaqueous solvents as appropriate.

Examples of the nonaqueous solvent include nonaqueous solvents of ethylene carbonate, propylene carbonate, butylene carbonate, trifluoropropylene carbonate, γ-butyrolactone, γ-valerolactone, sulfolane, 1,2-dimethoxyethane, 1,2-diethoxyethane, tetrahydrofuran, 2-methyltetrahydrofuran, 2-methyl-1,3-dioxolan, dioxolan, fluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl-propyl carbonate, dipropyl carbonate, methyl isopropyl carbonate, ethyl isopropyl carbonate, diisopropyl carbonate, dibutyl carbonate, acetonitrile, fluoroacetonitrile, alkoxy-substituted and halogen-substituted cyclic phosphazenes or chain phosphazenes such as ethoxy pentafluorocyclotriphosphazene, diethoxytetra fluorocyclotriphosphazene, and phenoxy pentafluorocyclotriphosphazene, phosphoric esters such as triethyl phosphate, trimethyl phosphate, and trioctyl phosphate, boric acid esters such as triethyl borate and tributyl borate, and N-methyl oxazolidinone and N-ethyl oxazolidinone.

The nonaqueous solvent may be any one of these or any mixture of these.

The nonaqueous electrolyte solution contains one or more of the well-known electrolytic salts enumerated above.

Examples include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_3)$, LiSCN, LiBr, LiI, $Li_2SO_4$, $Li_2B_{10}Cl_{10}$, $NaClO_4$, NaI, NaSCN, NaBr, $KClO_4$ and KSCN and mixtures of two or more of these compounds.

Furthermore, the nonaqueous electrolyte solution can contain any amount of other compounds as necessary in addition to the electrolytic salt(s) and the nonaqueous solvent to a degree that does not impair the advantageous effects of the present invention.

Examples of such compound include: carbonates such as lithium difluorophosphate, vinylene carbonate, methyl vinylene carbonate, ethyl vinylene carbonate, propyl vinylene carbonate, phenyl vinylene carbonate, vinyl ethylene carbonate, divinyl ethylene carbonate, dimethyl vinylene carbonate, diethyl vinylene carbonate, and fluoroethylene carbonate; vinyl esters such as vinyl acetate and vinyl propionate; sulfides such as diallyl sulfide, allyl phenyl sulfide, allyl vinyl sulfide, allyl ethyl sulfide, propyl sulfide, diallyl disulfide, allyl ethyl disulfide, allyl propyl disulfide, and allyl phenyl disulfide; cyclic sulfonic esters such as 1,3-propane sultone, 1,4-butane sultone, 1,3-propene sultone, and 1,4-butene sultone; chain sulfonic esters such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulphonate, methyl benzylsulfonate, ethyl benzylsulfonate, propyl benzylsulfonate, benzyl methanesulfonate, benzyl ethanesulfonate, and benzyl propanesulfonate; sulfite esters such as dimethyl sulfite, diethyl sulfite, ethyl methyl sulfite, methyl propyl sulfite, ethyl propyl sulfite, diphenyl sulfite, methyl phenyl sulfite, ethyl methyl sulfite, ethylene sulfite, vinyl ethylene sulfite, divinyl ethylene sulfite, propylene sulfite, vinyl propylene sulfite, butylene sulfite, vinyl butylene sulfite, vinylene sulfite, and phenyl ethylene sulfite; sulfate esters such as dimethyl sulfate, diethyl sulfate, diisopropyl sulfate, dibutyl sulfate, ethylene glycol sulfate ester, propylene glycol sulfate ester, butylene glycol sulfate ester, and pentene glycol sulfate ester; aromatic compounds such as benzene, toluene, xylene, fluorobenzene, biphenyl, cyclohexyl benzene, 2-fluorobiphenyl, 4-fluorobiphenyl, diphenyl ether, tert-butylbenzene, orthoterphenyl, metaterphenyl, naphthalene, fluoronaphthalene, cumene, fluorobenzene, and 2,4-difluoroanisole; halogen-substituted alkanes such as perfluorooctane; and silyl esters such as boric acid tristrimethylsilyl, bistrimethylsilyl sulphate, and tristrimethylsilyl phosphate.

Any one of these compounds or any mixture of two or more of these compounds may be used.

The negative-electrode active material of the nonaqueous electrolyte cell (lithium ion cell) of this embodiment may be any of appropriate well-known materials that can occlude and release lithium ions. Examples of such material include lithium metals, lithium alloys (lithium-containing alloys such as lithium-aluminum, lithium-lead, lithium-tin, lithium-aluminum-tin, lithium-gallium, and wood's metal), and alloys, carbon materials (such as graphite, hard carbon, low temperature fired carbon, soft carbon, and amorphous carbon), metal oxides, lithium metal oxides (such as $Li_4Ti_5O_{12}$), and polyphosphate compounds that can occlude and release lithium ions.

The positive-electrode active material may be any of appropriate well-known materials that can occlude and release lithium ions. For example, such material can be selected from the group consisting of composite oxides represented by $Li_xMO_y$ (M represents at least one transition metal) such as $Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, and $Li_xNi_yMn_{(2-y)}O_4$, and polyanion compounds represented by $Li_wMe_x(X-O_y)_z$ (Me represents at least one transition metal and X is for example P, Si, B, or V) such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Some of the elements or polyanions in these compounds may be substituted by other elements or anion species. The surface may be coated with a conductive material such as a carbon or a metal oxide such as $ZrO_2$, $WO_2$, MgO, or $Al_2O_3$. Other examples include, but not limited to, conductive polymer compounds such as disulfide, polypyrrole, polyaniline, polyparastyrene, polyacethylene, and polyacene materials and pseudo-graphite-structure carbonaceous materials. Any one of these compounds or any mixture of two or more of these compounds may be used.

Each of the positive and negative electrode active materials are mixed with a binder or the like, is applied to a surface of the current collector, is pressed and dried to form the positive electrode and the negative electrode.

The current collectors may be made of any of copper, nickel, iron, stainless steel, titanium, aluminum, low temperature fired carbon, soft carbon, conductive polymers, conductive glasses, Al—Cd alloys and the like. Furthermore, the surface of the current collectors made of any of these materials may be treated with a material such as chitosan or chitin, which are polysaccharide macromolecular polymers, the material being cross-linked by a cross-linker, or may be treated with carbon, nickel, titanium, or silver for the purpose of enhancing adhesiveness, conductivity, and resistance against reduction.

(Second Embodiment)

A cell of this embodiment is a cell that includes a positive electrode, a negative electrode, a separator disposed between the positive electrode and the negative electrode, and a nonaqueous electrolyte solution in which an electrolyte is dissolved in a nonaqueous solvent, wherein an inorganic filler layer is disposed between the positive electrode and the negative electrode and the nonaqueous electrolyte solution contains lithium difluorobis(oxalato)phosphate. Each of the positive and negative electrodes includes an active material layer and the inorganic filler layer is disposed on a surface of the active material layer of at least one of the positive electrode and the negative electrode.

The same specifics in the second embodiment as those in the first embodiment will not be repeatedly described.

The inorganic filler layer on the active material layer may be formed for example by coating a surface of a current collector with a material for the positive-electrode active material layer or the negative-electrode active material layer and, immediately thereafter, by coating with a mixture of the inorganic filler and the binder, then drying and pressing the whole structure as described in the first embodiment.

Alternatively, the surface of each current collector may be coated with a material for the positive-electrode active material layer or the negative-electrode active material layer, and the material may be dried, and then the mixture of the inorganic filler and the binder may be applied before pressing the whole structure.

Alternatively, the surface of each current collector may be coated with a material for the positive-electrode active material layer or the negative-electrode active material layer, the material may be dried and pressed, then the mixture of the inorganic filler and the binder may be applied to form the inorganic filler layer on the active material layer.

If the inorganic filler layer is provided on at least one of the positive electrode and the negative electrode in the second embodiment, the porosity of the inorganic filler layer is preferably less than or equal to 70 volume %, preferably in the range of 50 volume % to 70 volume %, more preferably in the range of 60 volume % to 70 volume %.

The porosity of the inorganic filler layer is more preferably in the ranges stated above and greater than or equal to the porosity of the separator.

If the porosity of the inorganic filler layer is less than the porosity of the separator, clogging tends to occur between the separator and the inorganic filler layer which is formed on the surface of the active material layer of at least one of the positive and negative electrodes so as to face the separator, for example. As a result, the internal resistance of the separator is likely to increase.

Choosing the porosity in the ranges stated above can inhibit reduction of the energy density and power density of the cell due to an increase in the weight of the cell.

Furthermore, choosing the porosity in the ranges stated above can inhibit a reduction in power output due to increase in the diffusion resistance of lithium ions in the inorganic filler layer which can occur if the inorganic filler layer is excessively thick.

The term porosity of the inorganic filler layer as used herein refers to a value calculated according to Equation (4) given below if the inorganic filler layer is disposed on the surface of the active material layer of at least one of the positive electrode and the negative electrode.

$$\text{porosity of inorganic filler layer (volume \%)} = 100 - [\{W_c \div (d_c \times \rho_c)\} \times 100] \quad (4)$$

where $W_c$: the weight of the inorganic filler layer per unit area (g/cm$^2$), $d_c$: the thickness of the inorganic filler layer (cm)

$\rho_c$: the average density of the inorganic filler layer (g/cm$^3$)

The weight of the inorganic filler layer per unit area, $W_c$ (g/cm$^2$), the thickness of the inorganic filler layer, $d_c$ (cm), and the average density of the inorganic filler layer, $\rho_c$ (g/cm$^3$), can be calculated according to Equations (5) to (7) given below.

$$W_c = W_2 - W_1 \quad (5)$$

where
W₁: the weight of the positive or negative electrode per unit area (g/cm²) before formation of the inorganic filler layer
W₂: the weight of the positive or negative electrode per unit area (g/cm²) after formation of the inorganic filler layer $$d_c = d_2 - d_1 \quad (6)$$

where
$d_1$: the thickness of the positive or negative electrode (cm) before formation of the inorganic filler layer
$d_2$: the thickness of the positive or negative electrode (cm) after formation of the inorganic filler layer $$\rho_c = 1 \div [\{(100-x) \div 100 \div \rho_1\} + (x \div 100 \div \rho_2)] \quad (7)$$

where
$\rho_1$: the true density of the inorganic filler (g/cm³)
$\rho_2$: the true density of the binder (g/cm³)
x: the composition ratio of the binder (mass %)
100−x: the composition ratio of the inorganic filler (mass %)

In this embodiment, the thickness of the inorganic filler layer after drying is preferably greater than or equal to 3 μm and less than the thickness of the separator.

The thickness is preferably in the range of 5 μm to 12 μm, more preferably in the range of approximately 5 μm to approximately 10 μm, provided that the thickness is less than the thickness of the separator.

The inorganic filler layer may be formed on one of the positive and the negative electrodes or on both of the positive and negative electrodes.

However, it is preferable that the inorganic filler layer be formed on only one of the positive and negative electrodes in terms of the energy density and power density of the electric storage device.

According to the embodiments described above, in an electric storage device in which lithium difluorobis(oxalato) phosphate is added to the nonaqueous electrolyte solution, swelling of the electric storage device due to gas generation after the initial charge and discharge can be inhibited.

Specifically, the electric storage device according to any of the embodiments described above includes a positive electrode, a negative electrode, a separator disposed between the positive and negative electrodes, and a nonaqueous electrolyte solution in which an electrolyte is dissolved in a nonaqueous solvent, wherein an inorganic filler layer is disposed between the positive and negative electrodes and the nonaqueous electrolyte solution contains lithium difluorobis(oxalato)phosphate. With this configuration, the inorganic filler can inhibit generation of gas and thus can inhibit swelling of the cell even when lithium difluorobis(oxalato) phosphate is reductively decomposed during initial charge.

While the electric storage devices according to the embodiments have been described above, it should be understood that the embodiments disclosed herein are illustrative and not limitative. The scope of the present invention is defined by the claims rather than by the preceding description, and all changes that fall within meets and bounds of the claims or equivalence of such meets and bounds are intended to be embraced by the claims.

EXAMPLES

The present invention will be described below in further detail with examples. However, the present invention is not limited to the examples.
<Test 1>
Test 1 was conducted on cells in which an inorganic filler layer is disposed on a separator, as described below.

Example 1

(Formation of Separator)
A polypropylene resin sheet (12 μm thick) with a weight-average molecular weight of 300,000 was biaxially stretched to form a separator.
(Formation of Inorganic Filler Layer)
One side of the separator is coated with a solution containing aluminosilicate, as inorganic filler, to form an inorganic filler layer.
Aluminosilicate used was prepared as follows. Sodium silicate and sodium aluminate were mixed at a molar ratio of 1:1 in purified water. The mixture was heated at 80° C., then cleaned with purified water to a pH level of 9 and dried.
The aluminosilicate solution was prepared by uniformly distributing the aluminosilicate and polyvinyl alcohol (with an average degree of polymerization of 1700 and a degree of saponification greater than or equal to 99%) in water. The surface of the separator was coated with this inorganic filler aqueous solution by means of a gravure coater and was dried at 60° C. to remove water, thereby forming a separator having an inorganic filler layer formed on it.
The thickness of the inorganic filler layer was determined by subtracting the thickness of the separator from the thickness of the separator coated with the inorganic filler layer. The determined thickness was 5 μm.
(Determination of Porosities of Separator and Inorganic Filler Layer)
A 10-cm-square sample was cut from the separator before being coated with the inorganic filler layer and the porosity was calculated from the volume and mass of the sample according to Equation (3) given earlier. The calculated porosity of the separator formed was 34.7%.
Then, a 10-cm-square sample was cut from the separator coated with the inorganic filler layer and the porosity of the inorganic filler layer was calculated from the mass and thickness of the sample according to Equations (1) and (2) given earlier. The calculated porosity of the inorganic filler layer was 64.7%.
(Determination of SiO₂-Equivalent Mass Ratio of Inorganic Filler Layer)
X-ray fluorescence spectrometer XRF-1800 from Shimadzu Corporation was used to perform measurement of element species observed at the surface of the inorganic filler layer.
K, Na, Ca, Ba, Rb, Cs, Al, Mg, Fe, Ti, Mn, Cr, Zn, V, Be, B, Si, Zr, Ce, and Y were extracted from among the measured element species and were assumed to be the following oxides: $K_2O$, $Na_2O$, $CaO$, $BaO$, $Rb_2O$, $Cs_2O$, $Al_2O_3$, $MgO$, $Fe_2O_3$, $TiO_2$, $MnO$, $Cr_2O_3$, $ZnO$, $V_2O_3$, $BeO$, $B_2O_3$, $SiO_2$, $ZrO_2$, $CeO_2$, and $Y_2O$, respectively, to calculate the $SiO_2$-equivalent mass ratio. The calculated content was 54%.
(Preparation of Nonaqueous Electrolyte Solution)
A nonaqueous electrolyte solution was prepared.
1 mol/l of $LiPF_6$ was dissolved in a solvent prepared by mixing ethylene carbonate, dimethyl carbonate, and ethyl methyl carbonate at a ratio of 30:35:35 (volume %), so that the concentration of lithium difluorobis(oxalato)phosphate was 1 mass %.
(Fabrication of Cell)
The negative electrode used was fabricated as follows. One side of a 10-μm-thick copper foil acting as a current collector was coated with a mixture serving as the material of the negative-electrode active material layer containing 92 mass % of amorphous carbon as a negative-electrode active material and 8 mass % of PVdF as a binder to a thickness of 115 μm. Then the copper foil coated with the mixture was pressed with a pressure roller to a thickness of 105 μm, then was dried at 150° C. for 12 hours to form the negative-electrode active material layer.

The positive electrode used was fabricated as follows. One side of a 20-μm-thick aluminum foil acting as a current collector was coated with a mixture serving as the material of the positive-electrode active material layer containing 90 mass % of $LiNi_{1/3}Mn_{1/3}Co_{1/3}O_2$ as a positive-electrode active material, 5 mass % of PVdF as a binder, and 5 mass % of acetylene black as a conductive additive to a thickness of 100 μm. Then the aluminum foil coated with the mixture was pressed with a pressure roller to a thickness of 90 μm, then was dried at 150° C. for 12 hours to form the positive-electrode active material layer.

The porosities of the positive- and negative-electrode active material layers described above were calculated according to Equations (8) and (9) given below. The calculated porosity of the positive-electrode active material layer was 35 volume % and the calculated porosity of the negative-electrode active material layer was 38 volume %.

(Determination of Porosities of Active Material Layers)

$$\text{porosity of active material layer (volume \%)} = [1 - \{W \div (d \times \rho)\}] \times 100 \quad (8)$$

where
W: the weight of the active material layer per unit area (g/cm²)
d: the thickness of the active material layer (cm)
ρ: the average density of the active material layer (g/cm³)

$$\rho = 1/[(x/100/\rho_a) + (y/100/\rho_b) + \{(100-x-y) \div 100 \div \rho_c\}] \quad (9)$$

where
$\rho_a$: the true density of the active material layer (g/cm³)
$\rho_b$: the true density of the binder (g/cm³)
$\rho_c$: the true density of the conductive additive (g/cm³)
x: the composition ratio of the active material (mass %)
y: the composition ratio of the binder (mass %)
100−x−y: the composition ratio of the conductive additive (mass %)

The layered electrode structure in which the negative and positive electrodes are stacked with the separator between them was placed in a case and the electrolyte solution was injected.

Note that the negative electrode, the positive electrode and the separator were stacked so that the inorganic filler layer faces the positive electrode.

Then, charging was performed with a current of 0.2 CA for one hour and the injection port was sealed to complete a 400 mAh prismatic cell.

Comparative Example 1

A 400 mAh prismatic cell was fabricated in the same way as example 1, except that no inorganic finer layer was formed on the separator.

Examples 2 to 4, Examples 28 to 30, and Comparative Examples 2 to 4

400 mAh prismatic cells were fabricated in the same way as example 1, except that the porosity of the inorganic filler layer was varied as shown in Table 1.

Example 5

A 400 mAh prismatic cell was fabricated in the same way as example 1, except that silica was used as the inorganic filler.

Example 6

A 400 mAh prismatic cell was fabricated in the same way as example 1, except that alumina was used as the inorganic filler.

Examples 7 to 9

400 mAh prismatic cells were fabricated in the same way as example 1, except that $SiO_2$-equivalent mass ratio in aluminosilicate was varied as shown in Table 1.

Examples 10 to 12

400 mAh prismatic cells were fabricated in the same way as example 1, except that aluminosilicate used in Example 1 was mixed with alumina with mixing ratios (mass ratios) shown in Table 1.

Examples 13 to 22

400 mAh prismatic cells were fabricated in the same way as example 1, except that the thickness of the inorganic filler layer was varied as shown in Table 1.

Examples 23 to 27

400 mAh prismatic cells were fabricated in the same way as example 1, except that the additive amount of lithium difluorobis(oxalato)phosphate was varied as shown in Table 1.

Comparative Examples 2 to 5

400 mAh prismatic cells were fabricated in the same way as comparative example 1, except that the additive amount of lithium difluorobis(oxalato)phosphate was varied as shown in Table 1.

Comparative Example 6

A 400 mAh prismatic cell was fabricated in the same way as comparative example 1, except that an amount of lithium bis(oxalato)borate ($LiB(O_x)_2$) shown in Table 1 was added instead of lithium difluorobis(oxalato)phosphate.

Comparative Example 7

A 400 mAh prismatic cell was fabricated in the same way as example 24, except that an amount of lithium bis(oxalato)borate ($LiB(O_x)_2$) shown in Table 1 was added instead of lithium difluorobis(oxalato)phosphate.

Comparative Example 8

A 400 mAh prismatic cell was fabricated in the same way as example 22, except that an amount of lithium bis(oxalato)borate ($LiB(O_x)_2$) shown in Table 1 was added instead of lithium difluorobis(oxalato)phosphate.

Table 1 shows the materials, thicknesses, porosites, and $SiO_2$-equivalent mass ratios of the inorganic fillers and the additive amounts of lithium difluorobis(oxalato)phosphate used in the prismatic cells of examples 2 to 27 and comparative examples 1 to 8.

(Measurement of Cell Swelling)

Cells of examples 1 to 30 and comparative examples 1 to 8 were charged with a constant current of 1 CA to 4.2 V, then was charged at a constant voltage of 4.2 V for a total charge time of 3 hours. Then the cells were discharged with a constant current of 1 CA to 2.4 V.

The discharged capacity at this point in time was considered as the discharged capacity before the cycles. The thickness of the center of each cell before and after charge and discharge was measured to determine cell swelling.

Note that 1 CA is a current value with which a fully-charged cell discharges in 1 hour.

(Capacity Retention after Cycles)

A 5000-cycle test was conducted on each of examples 1, 23, and 24 and comparative examples 1, 2 and 3 in a constant-temperature bath at 55° C. In each cycle, the cells were charged to a voltage equivalent to SOC 80% with a constant current of 2 CA, then the cells were discharged to a voltage equivalent to SOC 20% with a constant current of 2 CA.

Thereafter, the cells were charged with a constant current of 1 CA at room temperature to 4.2 V, then charged for a total charge time of 3 hours at 4.2 V, and then discharged to 2.4 V with a constant current of 1 CA. The discharged capacity at this point in time was considered as the discharged capacity after the cycles.

The discharged capacity after the cycles was divided by the discharged capacity before the cycles to determine capacity retention after the cycles.

Table 1 shows cell swelling and capacity retention after the cycles.

TABLE 1

| | INORGANIC FILLER | | | | | |
|---|---|---|---|---|---|---|
| | MATERIAL 1 | MATERIAL 2 | MIXTURE RATIO OF MATERIAL 1/ MATERIAL 2 | THICKNESS ($\mu M$) | POROSITY (VOL %) | $SiO_2$-EQUIVALENT WEIGHT RATIO (WT %) |
| EX. 1 | ALUMINOSILICATE | — | — | 5 | 65.3 | 54 |
| EX. 2 | ALUMINOSILICATE | — | — | 5 | 51.0 | 54 |
| EX. 3 | ALUMINOSILICATE | — | — | 6 | 61.3 | 54 |
| EX. 4 | ALUMINOSILICATE | — | — | 6 | 69.6 | 54 |
| EX. 5 | SILICA | — | — | 6 | 64.3 | 100 |
| EX. 6 | ALUMINA | — | — | 5 | 65.2 | 0 |
| EX. 7 | ALUMINOSILICATE | — | — | 6 | 66.6 | 69 |
| EX. 8 | ALUMINOSILICATE | — | — | 6 | 65.5 | 78 |
| EX. 9 | ALUMINOSILICATE | — | — | 6 | 67.8 | 84 |
| EX. 10 | ALUMINOSILICATE | ALUMINA | 1 | 5 | 64.2 | 26 |
| EX. 11 | ALUMINOSILICATE | ALUMINA | 2 | 6 | 65.9 | 39 |
| EX. 12 | ALUMINOSILICATE | ALUMINA | 3 | 6 | 64.1 | 42 |
| EX. 13 | ALUMINOSILICATE | — | — | 2 | 66.3 | 54 |
| EX. 14 | ALUMINOSILICATE | — | — | 3 | 66.2 | 54 |
| EX. 15 | ALUMINOSILICATE | — | — | 7 | 64.5 | 54 |
| EX. 16 | ALUMINOSILICATE | — | — | 9 | 65.8 | 54 |
| EX. 17 | ALUMINOSILICATE | — | — | 10 | 66.3 | 54 |
| EX. 18 | ALUMINOSILICATE | — | — | 12 | 64.9 | 54 |
| EX. 19 | ALUMINOSILICATE | — | — | 13 | 66.8 | 54 |
| EX. 20 | ALUMINOSILICATE | — | — | 15 | 64.1 | 54 |
| EX. 21 | ALUMINOSILICATE | — | — | 20 | 65.6 | 54 |
| EX. 22 | ALUMINOSILICATE | — | — | 25 | 66.4 | 54 |
| EX. 23 | ALUMINOSILICATE | — | — | 6 | 64.3 | 54 |
| EX. 24 | ALUMINOSILICATE | — | — | 5 | 65.3 | 54 |
| EX. 25 | ALUMINOSILICATE | — | — | 5 | 65.3 | 54 |
| EX. 26 | ALUMINOSILICATE | — | — | 6 | 64.3 | 54 |
| EX. 27 | ALUMINOSILICATE | — | — | 6 | 64.3 | 54 |
| COMP. EX. 1 | NONE | — | — | — | | 0 |
| EX. 28 | ALUMINOSILICATE | — | — | 5 | 30.2 | 54 |
| EX. 29 | ALUMINOSILICATE | — | — | 6 | 75.8 | 54 |
| EX. 30 | ALUMINOSILICATE | — | — | 6 | 80.4 | 54 |
| COMP. EX. 2 | NONE | — | — | — | | 0 |
| COMP. EX. 3 | NONE | — | — | — | | 0 |
| COMP. EX. 4 | NONE | — | — | — | | 0 |
| COMP. EX. 5 | NONE | — | — | — | | 0 |
| COMP. EX. 6 | NONE | — | — | — | | 0 |
| COMP. EX. 7 | ALUMINOSILICATE | — | — | 5 | 65.3 | 54 |
| COMP. EX. 8 | ALUMINOSILICATE | — | — | 25 | 66.4 | 54 |

TABLE 1-continued

| | SEPARATOR | | ADDITIVE AGENT | | CELL SWELLING (mm) | CAPACITY RETENTION AFTER CYCLES (%) |
|---|---|---|---|---|---|---|
| | THICKNESS (μM) | POROSITY (VOL %) | ADDITIVE AGENT | ADDITIVE AMOUNT (MASS %) | | |
| EX. 1 | 12 | 34.7 | LiFOP | 1 | 0.3 | 86.3 |
| EX. 2 | 12 | 34.7 | LiFOP | 1 | 0.4 | |
| EX. 3 | 12 | 34.7 | LiFOP | 1 | 0.3 | |
| EX. 4 | 12 | 34.7 | LiFOP | 1 | 0.4 | |
| EX. 5 | 12 | 34.7 | LiFOP | 1 | 0.5 | |
| EX. 6 | 12 | 34.7 | LiFOP | 1 | 1.0 | |
| EX. 7 | 12 | 34.7 | LiFOP | 1 | 0.4 | |
| EX. 8 | 12 | 34.7 | LiFOP | 1 | 0.3 | |
| EX. 9 | 12 | 34.7 | LiFOP | 1 | 0.5 | |
| EX. 10 | 12 | 34.7 | LiFOP | 1 | 0.9 | |
| EX. 11 | 12 | 34.7 | LiFOP | 1 | 0.7 | |
| EX. 12 | 12 | 34.7 | LiFOP | 1 | 0.5 | |
| EX. 13 | 12 | 34.7 | LiFOP | 1 | 0.9 | |
| EX. 14 | 12 | 34.7 | LiFOP | 1 | 0.6 | |
| EX. 15 | 12 | 34.7 | LiFOP | 1 | 0.4 | |
| EX. 16 | 12 | 34.7 | LiFOP | 1 | 0.3 | |
| EX. 17 | 12 | 34.7 | LiFOP | 1 | 0.4 | |
| EX. 18 | 12 | 34.7 | LiFOP | 1 | 0.5 | |
| EX. 19 | 12 | 34.7 | LiFOP | 1 | 0.8 | |
| EX. 20 | 12 | 34.7 | LiFOP | 1 | 0.7 | |
| EX. 21 | 12 | 34.7 | LiFOP | 1 | 0.8 | |
| EX. 22 | 12 | 34.7 | LiFOP | 1 | 0.8 | |
| EX. 23 | 12 | 34.7 | LiFOP | 0.1 | 0.7 | 76.8 |
| EX. 24 | 12 | 34.7 | LiFOP | 0.2 | 0.2 | 78.9 |
| EX. 25 | 12 | 34.7 | LiFOP | 0.5 | 0.3 | |
| EX. 26 | 12 | 34.7 | LiFOP | 1.2 | 0.9 | |
| EX. 27 | 12 | 34.7 | LiFOP | 1.5 | 1.0 | |
| COMP. EX. 1 | 12 | 34.7 | LiFOP | 1 | 1.6 | 77.5 |
| EX. 28 | 12 | 34.7 | LiFOP | 1 | 1.3 | |
| EX. 29 | 12 | 34.7 | LiFOP | 1 | 1.1 | |
| EX. 30 | 12 | 34.7 | LiFOP | 1 | 1.2 | |
| COMP. EX. 2 | 12 | 34.7 | LiFOP | 0.1 | 0.8 | 72.5 |
| COMP. EX. 3 | 12 | 34.7 | LiFOP | 0.2 | 1.2 | 74.3 |
| COMP. EX. 4 | 12 | 34.7 | LiFOP | 1.2 | 1.0 | |
| COMP. EX. 5 | 12 | 34.7 | LiFOP | 1.5 | 2.4 | |
| COMP. EX. 6 | 12 | 34.7 | LiB(Ox)2 | 1 | 0 | |
| COMP. EX. 7 | 12 | 34.7 | LiB(Ox)2 | 1 | 0.1 | |
| COMP. EX. 8 | 12 | 34.7 | LiB(Ox)2 | 1 | 0 | |

When examples 1 to 30 are compared with comparative example 1, the cells that use a nonaqueous electrolyte solution containing lithium difluorobis(oxalato)phosphate and include a separator with an inorganic filler layer exhibit reduced cell swelling.

Examples 1 to 27 shows that especially the cells in which the inorganic filler layer has a porosity greater than or equal to the porosity of the separator and less than or equal to 70 volume % have a great effect of inhibiting cell swelling.

The examples including aluminosilicate or silica as the inorganic filler has a great effect of inhibiting cell swelling. Among those examples, especially the examples in which the $SiO_2$-equivalent mass ratio is greater than 40% have a great effect.

Examples 1 to 12, 14 to 18, and 23 to 30, in which the thickness of the inorganic filler layer is greater than or equal to 3 μm and less than or equal to the thickness of the separator, show remarkably small cell swelling.

As comparative examples 2 and 3 show, the cells in which the nonaqueous electrolyte solution contain 1.0 mass % or less of lithium difluorobis(oxalato)phosphate exhibit cell swelling. On the other hand, the cells of the examples using a separator with an inorganic filler layer exhibited reduced cell swelling at all concentrations of lithium difluorobis(oxalato)phosphate.

The cells in which the nonaqueous electrolyte solution contains 1.0 mass % or more of lithium difluorobis(oxalato)phosphate exhibit reduced swelling because of the provision of the separator with inorganic filler layer (examples 26 and 27 and comparative examples 4 and 5).

Note that comparative examples 6 to 8, in which the nonaqueous electrolyte solution does not contain lithium difluorobis(oxalato)phosphate, exhibit no cell swelling.

Furthermore, as examples 1, 23 and 24 show, the cells in which the nonaqueous electrolyte solution contains lithium difluorobis(oxalato)phosphate and the separator with inorganic filler layer is provided exhibit improved capacity retention after the cycles.

The degree of improvement in capacity retention after the cycles with the increase of the additive amount of lithium difluorobis(oxalato)phosphate is more remarkable in the cells including the separator with an inorganic filler layer.

These results demonstrate that the cells of the examples exhibit smaller cell swelling and have excellent cycle performance.

<Test 2>

Test 2 was conducted on cells in which an inorganic filler layer is disposed on the positive-electrode active material layer or the negative-electrode active material layer, as follows.

Example 31

A 400 mAh prismatic cell was fabricated in the same way as example 1 described above, except that the inorganic filler layer of example 1 was formed on the positive-electrode active material layer instead of the separator.

The inorganic filler layer was formed on the positive-electrode active material layer as follows.

The surface of the positive-electrode active material layer formed in the same way as example 1 was coated with the same inorganic filler aqueous solution that was used in example 1 using a gravure coater, was dried at 150° C. to remove water, thereby forming a positive-electrode active material layer having an inorganic filler layer formed on it.

The thickness of the inorganic filler layer is determined by subtracting the thickness of the active material layer and the aluminum foil from the thickness of the inorganic filler layer and the positive electrode. The determined thickness was 5 μm.

Examples 32 to 42

400 mAh prismatic cells of examples 32 to 42 were fabricated in the same way as examples 2 to 12, respectively, except that the inorganic filler layer was formed on the positive-electrode active material layer in the same way as example 31.

Examples 43 to 45

400 mAh prismatic cells of examples 43 to 45 were fabricated in the same way as examples 28 to 30, respectively, except that the inorganic filler layer was formed on the positive-electrode active material layer in the same way as example 31.

Examples 46 to 60

400 mAh prismatic cells were fabricated in the same way as examples 31 to 45, except that the inorganic filler layer of example 31 was formed on the negative-electrode active material layer instead of the positive-electrode active material layer.

The inorganic filler layer was formed on the negative-electrode active material layer as follows.

The surface of the negative-electrode active material layer formed in the same way as example 1 was coated with the same inorganic filler aqueous solution that was used in example 1 using a gravure coater, was dried at 150° C. to remove water, thereby forming a negative-electrode active material layer having an inorganic filler layer formed on it.

The thickness of the inorganic filler layer is determined by subtracting the thickness of the negative-electrode active material layer and the copper foil from the thickness of the inorganic filler layer and the negative electrode. The determined thicknesses are shown in Table 2.

Table 2 shows the materials, thicknesses, porosities, $SiO_2$-equivalent mass ratios of the inorganic filler layers and the additive amounts of lithium difluorobis(oxalato)phosphate in the prismatic cells of examples 31 to 60 fabricated as described above.

Cell swelling in examples 31 to 60 was measured as in the examples 1 to 30 and comparative examples 1 to 8 and capacity retention after the cycles in examples 31 and 46 was measured as in examples 1, 23 and 24 and comparative examples 1, 2 and 3. The measurements are shown in Table 2.

For comparison, the measurements of example 1 are also shown Table 2.

TABLE 2

| | INORGANIC FILLER | | | | | |
|---|---|---|---|---|---|---|
| | MATERIAL 1 | MATERIAL 2 | MIXTURE RATIO OF MATERIAL 1/ MATERIAL 2 | THICKNESS (μM) | POROSITY (VOL %) | $SiO_2$-EQUIVALENT WEIGHT RATIO (WT %) |
| EX. 31 | ALUMINOSILICATE | — | — | 5 | 65.3 | 54 |
| EX. 32 | ALUMINOSILICATE | — | — | 5 | 51.0 | 54 |
| EX. 33 | ALUMINOSILICATE | — | — | 6 | 61.3 | 54 |
| EX. 34 | ALUMINOSILICATE | — | — | 6 | 69.6 | 54 |
| EX. 35 | SILICA | — | — | 6 | 64.3 | 100 |
| EX. 36 | ALUMINA | — | — | 5 | 65.2 | 0 |
| EX. 37 | ALUMINOSILICATE | — | — | 6 | 66.6 | 69 |
| EX. 38 | ALUMINOSILICATE | — | — | 6 | 65.5 | 78 |
| EX. 39 | ALUMINOSILICATE | — | — | 6 | 67.8 | 84 |
| EX. 40 | ALUMINOSILICATE | ALUMINA | 1 | 5 | 64.2 | 26 |
| EX. 41 | ALUMINOSILICATE | ALUMINA | 2 | 6 | 65.9 | 39 |
| EX. 42 | ALUMINOSILICATE | ALUMINA | 3 | 6 | 64.1 | 42 |
| COMP. EX. 1 | NONE | — | — | | | 0 |
| EX. 43 | ALUMINOSILICATE | — | — | 5 | 30.2 | 54 |
| EX. 44 | ALUMINOSILICATE | — | — | 6 | 75.8 | 54 |
| EX. 45 | ALUMINOSILICATE | — | — | 6 | 80.4 | 54 |
| EX. 46 | ALUMINOSILICATE | — | — | 5 | 65.3 | 54 |
| EX. 47 | ALUMINOSILICATE | — | — | 5 | 51.0 | 54 |
| EX. 48 | ALUMINOSILICATE | — | — | 6 | 61.3 | 54 |
| EX. 49 | ALUMINOSILICATE | — | — | 6 | 69.6 | 54 |
| EX. 50 | SILICA | — | — | 6 | 64.3 | 100 |

TABLE 2-continued

| | | | | | | | Separator Coated Surface | Separator Thickness (μM) | Separator Porosity (VOL %) | Additive Agent Additive Agent | Additive Agent Additive Amount (MASS %) | Cell Swelling (mm) | Capacity Retention After Cycles (%) |
|---|---|---|---|---|---|---|---|---|---|---|---|---|---|
| EX. 51 | ALUMINA | — | — | 5 | 65.2 | 0 | | | | | | | |
| EX. 52 | ALUMINOSILICATE | — | — | 6 | 66.6 | 69 | | | | | | | |
| EX. 53 | ALUMINOSILICATE | — | — | 6 | 65.5 | 78 | | | | | | | |
| EX. 54 | ALUMINOSILICATE | — | — | 6 | 67.8 | 84 | | | | | | | |
| EX. 55 | ALUMINOSILICATE | ALUMINA | 1 | 5 | 64.2 | 26 | | | | | | | |
| EX. 56 | ALUMINOSILICATE | ALUMINA | 2 | 6 | 65.9 | 39 | | | | | | | |
| EX. 57 | ALUMINOSILICATE | ALUMINA | 3 | 6 | 64.1 | 42 | | | | | | | |
| COMP. EX. 1 | NONE | — | — | | | 0 | | | | | | | |
| EX. 58 | ALUMINOSILICATE | — | — | 5 | 30.2 | 54 | | | | | | | |
| EX. 59 | ALUMINOSILICATE | — | — | 6 | 75.8 | 54 | | | | | | | |
| EX. 60 | ALUMINOSILICATE | — | — | 6 | 80.4 | 54 | | | | | | | |
| EX. 31 | | | | | | | POSITIVE ELECTRODE | 12 | 34.7 | LiFOP | 1 | 0.2 | 85.2 |
| EX. 32 | | | | | | | POSITIVE ELECTRODE | 12 | 34.7 | LiFOP | 1 | 0.3 | |
| EX. 33 | | | | | | | POSITIVE ELECTRODE | 12 | 34.7 | LiFOP | 1 | 0.4 | |
| EX. 34 | | | | | | | POSITIVE ELECTRODE | 12 | 34.7 | LiFOP | 1 | 0.3 | |
| EX. 35 | | | | | | | POSITIVE ELECTRODE | 12 | 34.7 | LiFOP | 1 | 0.6 | |
| EX. 36 | | | | | | | POSITIVE ELECTRODE | 12 | 34.7 | LiFOP | 1 | 0.9 | |
| EX. 37 | | | | | | | POSITIVE ELECTRODE | 12 | 34.7 | LiFOP | 1 | 0.3 | |
| EX. 38 | | | | | | | POSITIVE ELECTRODE | 12 | 34.7 | LiFOP | 1 | 0.4 | |
| EX. 39 | | | | | | | POSITIVE ELECTRODE | 12 | 34.7 | LiFOP | 1 | 0.4 | |
| EX. 40 | | | | | | | POSITIVE ELECTRODE | 12 | 34.7 | LiFOP | 1 | 1.0 | |
| EX. 41 | | | | | | | POSITIVE ELECTRODE | 12 | 34.7 | LiFOP | 1 | 0.8 | |
| EX. 42 | | | | | | | POSITIVE ELECTRODE | 12 | 34.7 | LiFOP | 1 | 0.4 | |
| COMP. EX. 1 | | | | | | | POSITIVE ELECTRODE | 12 | 34.7 | LiFOP | 1 | 1.6 | 77.5 |
| EX. 43 | | | | | | | POSITIVE ELECTRODE | 12 | 34.7 | LiFOP | 1 | 1.2 | |
| EX. 44 | | | | | | | POSITIVE ELECTRODE | 12 | 34.7 | LiFOP | 1 | 1.2 | |
| EX. 45 | | | | | | | POSITIVE ELECTRODE | 12 | 34.7 | LiFOP | 1 | 1.1 | |
| EX. 46 | | | | | | | NEGATIVE ELECTRODE | 12 | 34.7 | LiFOP | 1 | 0.2 | 86.7 |
| EX. 47 | | | | | | | NEGATIVE ELECTRODE | 12 | 34.7 | LiFOP | 1 | 0.4 | |
| EX. 48 | | | | | | | NEGATIVE ELECTRODE | 12 | 34.7 | LiFOP | 1 | 0.4 | |
| EX. 49 | | | | | | | NEGATIVE ELECTRODE | 12 | 34.7 | LiFOP | 1 | 0.3 | |
| EX. 50 | | | | | | | NEGATIVE ELECTRODE | 12 | 34.7 | LiFOP | 1 | 0.5 | |
| EX. 51 | | | | | | | NEGATIVE ELECTRODE | 12 | 34.7 | LiFOP | 1 | 1.0 | |
| EX. 52 | | | | | | | NEGATIVE ELECTRODE | 12 | 34.7 | LiFOP | 1 | 0.4 | |
| EX. 53 | | | | | | | NEGATIVE ELECTRODE | 12 | 34.7 | LiFOP | 1 | 0.4 | |
| EX. 54 | | | | | | | NEGATIVE ELECTRODE | 12 | 34.7 | LiFOP | 1 | 0.5 | |
| EX. 55 | | | | | | | NEGATIVE ELECTRODE | 12 | 34.7 | LiFOP | 1 | 1.0 | |
| EX. 56 | | | | | | | NEGATIVE ELECTRODE | 12 | 34.7 | LiFOP | 1 | 0.9 | |
| EX. 57 | | | | | | | NEGATIVE ELECTRODE | 12 | 34.7 | LiFOP | 1 | 0.4 | |
| COMP. EX. 1 | | | | | | | NEGATIVE ELECTRODE | 12 | 34.7 | LiFOP | 1 | 1.6 | 77.5 |

TABLE 2-continued

| EX. 58 | NEGATIVE ELECTRODE | 12 | 34.7 | LiFOP | 1 | 1.3 |
|---|---|---|---|---|---|---|
| EX. 59 | NEGATIVE ELECTRODE | 12 | 34.7 | LiFOP | 1 | 1.2 |
| EX. 60 | NEGATIVE ELECTRODE | 12 | 34.7 | LiFOP | 1 | 1.2 |

As shown in Table 2, the cells in which the inorganic filler layer is formed on the positive- or negative-electrode active material layer and the nonaqueous electrolyte solution contains lithium difluorobis(oxalato)phosphate exhibit reduced cell swelling, like the cells in which the inorganic filler layer is formed on the separator.

Especially, the cells in which the porosity of the inorganic filler layer is greater than or equal to the porosity of the separator and less than or equal to 70 volume % have a great effect of inhibiting cell swelling.

The cells containing aluminosilicate or silica as the inorganic filler have a great effect of inhibiting cell swelling. Especially, the cells of the examples in which the $SiO_2$-equivalent mass ratio is greater than or equal to 40% have a remarkably greater effect.

The cells in which the thickness of the inorganic filler layer is greater than or equal to 3 µm and less than the thickness of the separator exhibit remarkably small cell swelling.

The cells in which the nonaqueous electrolyte solution contains lithium difluorobis(oxalato)phosphate and the inorganic filler layer is formed on the positive- or negative-electrode active material layer show improved capacity retention after the cycles as compared with the cells of comparative example 1 in which no inorganic filler layer is provided.

These results demonstrate that the cells of the examples in which the inorganic filler layer is formed on the positive- or negative-electrode active material layer exhibit reduced cell swelling and have excellent cycle performance.

What is claimed is:

1. A method for manufacturing an electric storage device comprising:
    placing a layered electrode structure in which negative and positive electrodes are stacked with a separator and an inorganic filler layer therebetween in a case having an injection port, wherein the inorganic filler layer contains aluminosilicate,
    injecting a nonaqueous electrolyte solution in the case, wherein the nonaqueous electrolyte solution contains electrolyte, nonaqueous solvent, and lithium difluorobis(oxalato)phosphate, and
    sealing the injection port of the case after charging, the charging causing lithium difluorobis(oxalato)phosphate to be reductively decomposed and thereby the nonaqueous electrolyte solution to generate gas.

2. The method for manufacturing an electric storage device according to claim 1, wherein the inorganic filler layer is disposed on a surface of the separator.

3. The method for manufacturing an electric storage device according to claim 1, wherein:
    each of the positive electrode and the negative electrode comprises an active material layer; and
    the inorganic filler layer is disposed on a surface of the active material layer of at least one of the positive electrode and the negative electrode.

4. The method for manufacturing an electric storage device according to claim 1, wherein a porosity of the inorganic filler layer is greater than or equal to a porosity of the separator and less than or equal to 70 volume %.

5. The method for manufacturing an electric storage device according to claim 1, wherein a thickness of the inorganic filler layer is greater than or equal to 3µm and less than or equal to a thickness of the separator.

6. The method for manufacturing an electric storage device according to claim 1, wherein a content of the lithium difluorobis(oxalato)phosphate in the nonaqueous electrolyte solution is greater than or equal to 0.2 mass % and less than or equal to 1 mass %.

7. The method for manufacturing an electric storage device according to claim 1, wherein a $SiO_2$-equivalent mass ratio of a Si element in the inorganic filler layer is greater than or equal to 40%.

* * * * *